United States Patent [19]

Kinder

[11] Patent Number: 4,721,216

[45] Date of Patent: Jan. 26, 1988

[54] HOLDER FOR DRINKS AND THE LIKE

[76] Inventor: Bobby L. Kinder, HC74, Box 195, Graham, Tex. 76046

[21] Appl. No.: 18,024

[22] Filed: Feb. 24, 1987

[51] Int. Cl.⁴ .................... B65D 23/00; B65D 81/18
[52] U.S. Cl. .................... 215/100.5; D7/70; D9/455; 220/85 H; 220/903; 248/105; 248/142; 248/311.2
[58] Field of Search .................... D7/70, 71; D9/455; 4/452; 150/52 R; 206/217, 303, 446, 562; 215/6, 10, 12 R, 100.5, 100 R, 13 R; 220/17.1–17.3, 18, 85 H, 90.4, 410, 903; 229/1.5 H; 248/102–105, 133, 146, 310, 311.2, 313, 371, 398; 224/280, 42.42

[56] References Cited

U.S. PATENT DOCUMENTS

| | | | |
|---|---|---|---|
| D. 163,995 | 7/1951 | Firanzi | D7/70 |
| D. 289,722 | 5/1987 | Neiser | D7/70 |
| 1,729,531 | 9/1929 | Wolever | 248/105 |
| 2,397,059 | 3/1946 | Swank | 248/105 |
| 2,451,718 | 10/1948 | Corrao | 248/105 |
| 3,090,478 | 5/1963 | Stanley | 220/85 H |
| 3,103,295 | 9/1963 | Ghee | 215/100.5 |
| 3,249,950 | 5/1966 | Wilson | 4/452 |
| 3,698,675 | 10/1972 | Lerew et al. | D7/70 |

FOREIGN PATENT DOCUMENTS

| | | | |
|---|---|---|---|
| 0011341 | 11/1890 | United Kingdom | 220/17.1 |
| 1444873 | 8/1976 | United Kingdom | 248/105 |

*Primary Examiner*—Jimmy G. Foster
*Attorney, Agent, or Firm*—James C. Fails; Wm. T. Wofford; Arthur F. Zobal

[57] ABSTRACT

A holder for a container for drinks and the like characterized by an arcuate first end adapted to fit the intercrural region and terminating in a second squared-off end; having a sloping bottom and; being adapted to sit between the legs of a person in the seat of a car for facilitating setting a drink container into a holder and retrieving the drink container from the holder for drinking safely even if the person is driving the vehicle. The holder has a receptacle and is formed of an insulating material. Preferably, the receptacle has an upper portion that is larger in diameter than a bottom portion and both portions are substantially cylindrical such that either an inverted frusto-conical drink container, a drink can or a drink can with an insulating sleeve around it can be set into the receptacle.

3 Claims, 4 Drawing Figures

HOLDER FOR DRINKS AND THE LIKE

FIELD OF THE INVENTION

This invention relates to a portable holder for a beverage container, and more particularly, to a holder for a container for a drink, or beverage, so that the container can be easily and safely positioned in the holder on an inclined surface, such as an automobile seat, or retrieved for drinking by the peson.

DESCRIPTION OF THE PRIOR ART

The prior art has seen the development of a wide variety of holders for containers for beverages, drinks or the like. These have ranged from collapsible containers, or holders, such as might be used in a drive-in, to automobile seat holders. A search of the prior art turned up the following references:

U.S. Pat. No. 2,640,595, shows an automobile seat article holder in which a tab is pivotally mounted about a hinge member that is also mounted on a base that has upstanding receptacle walls for holding cups, baby bottles and the like.

U.S. Pat. No. 2,875,940, shows a portable food and beverage container, or holder, that has serrated cardboard with separate flexible tabs 17 and 18 respectfully arranged concentrically around apertures in the top panel and has a bottom portion spaced therefrom by foldable walls. One end of the container or holder has a leg that can be placed at the lower portion of a seat for maintaining the holder more nearly level.

U.S. Pat. No. 3,326,445, shows a car seat tray of the type used in drive-in restaurants wherein the food or beverage could be served to the occupants of a motor vehicle and put on the seat of the vehicle or the like; for example, while the occupant is eating. Such a car seat tray is a foldable blank of cardboard or the like that can be folded into a desired configuration to maintain a substantially level platform for holding food such as hamburgers in a central tray portin and having drinks set in the pair of wells defined by flexible tabs around an aperture in the top such that the drinks will sit on the bottom, the top and bottom being held apart by foldable walls.

U.S. Pat. No. 3,499,595, shows a collapsible food and beverage serving tray similar to those delineated hereinbefore and having a downwardly foldable leg or prop for propping outside the window of the car or propping in the seat of an automobile.

U.S. Pat. No. 4,106,829, discloses a portable motor vehicle drink cooler, caddy and arm rest having an insulated box with a lid for holding containers of drinks and having formed therewith a caddy with a wall having a contoured bottom for fitting the top of the car seat and having a forward portion receptacle for receiving drinks. The lid may be removable if desired.

From the foregoing, it can be seen that the prior art has not provided an economical, readily made drink holder that can be set between the legs on a couch, in the seat of an automobile or the like and into which a container holding a drink can be emplaced and retrieved and replaced safely without spilling.

SUMMARY OF THE INVENTION

Accordingly, it is an object of this invention to provide an economical holder for a container for drinks or the like that can be emplaced between the legs of a person, afford a more nearly level surface that the surface on which the person is sitting and a holder into which and from which a drink container can be safely and readily retrieved and replaced so that even if a driver is holding a drink, it can be safely retrieved and replaced without spilling.

It is a particular object of this invention to provide a holder for a container providing a receptacle somewhat larger than the container so that even if there is a slopping of a beverage, it falls into the receptacle and in which the holder is made of an impermeable insulating thermoplastic foam that also reduces heat transfer between the drink and the ambient surroundings, the holder having a rounded first end for fitting into the inter-crural region and a squared-off second end extending toward the knees and having an unlevel bottom, or bottom that is formed at an angle in the range of 10°–40° so as to provide a more nearly level holding of the container of the drink.

These and other objects will become apparent from the following descriptive matter, particularly when taken in conjunction with the accompanying drawings.

In accordance with this invention there is provided a holder for a container for drinks and the like adapted for safely holding a drink container in surroundings involving an unlevel surface and a person; and comprising a unitary structure formed of insulating material and having an arcuate first end of a first depth and a squared-off end of a second depth and having a receptacle formed therein sufficiently deep to hold a drink container and being more than two inches in depth, the insulating material serving to reduce heat transfer between the drink and the surroundings. The holder is adapted to sit between the legs of the person with the first end adapted to fit the inter-crural region between the legs with the second end extending away from the intercrural region toward the knees. The first depth is larger than the second depth sufficiently to attain a more nearly level condition for the drink container on the unlevel surface and sufficient for forming a bottom that has an angle alpha with respect to the horizontal in the range of 10°–40° such that a container of drink can be easily and safely retrieved and replaced in the holder even by a driver of an automobile.

Preferably, the receptacle of a holder has a top portion that is of larger diameter than the bottom portion such that even is a drink if slopped over the edges of the container, it will fall into the receptacle and not wet the person. Moreover, the upward portion is of sufficiently large diameter that it can hold a can of beverage with an insulating sleeve around it; whereas, the bottom portion is adapted to hold the drink can alone or the bottom of a tapered drink such as an inverted frusto-conical cup or Styrofoam cup that has a larger opening at the top than its bottom.

DESCRIPTION OF PREFERRED EMBODIMENT

Figure 1:
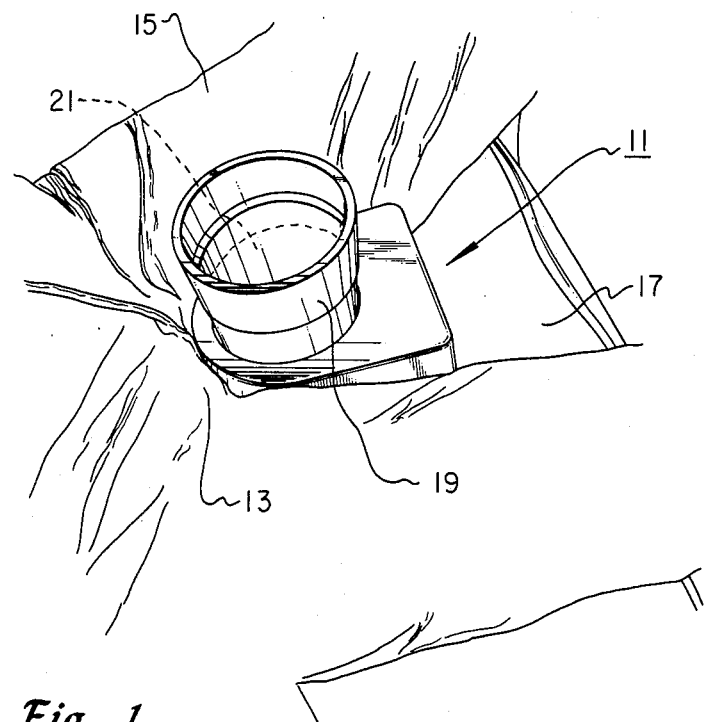
FIG. 1 shows a partial isometric view the invention in use.

The invention may be understood more nearly completely by referring to the FIGS. 1–4. FIG. 1 illustrates the holder 11 emplaced in the inter-crural region 13 between the legs 15 of a person such as a driver of a car or the like. The holder 11 is adapted to sit on a seat 17; such as, a car seat, a couch cushion or the like; and provide a more nearly level surface than the surface of the seat 17. A container 19 having a beverage, or drink 21 therewithin may be set into the receptacle of the holder 11 and safely retrieved and replaced with minimum danger of spilling beverage or other untoward accidents.

Figure 2:
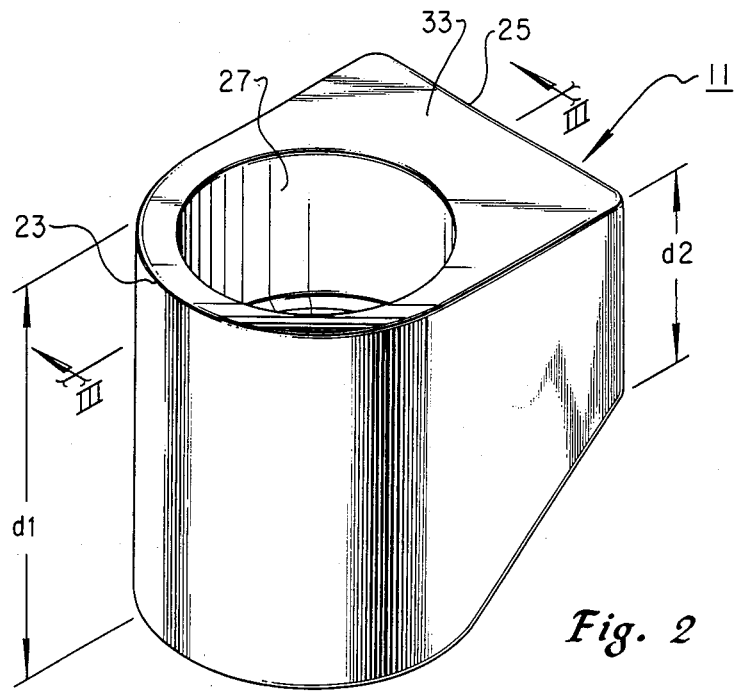
FIG. 2 is an elevated isometric view of the invention.
Figure 3:
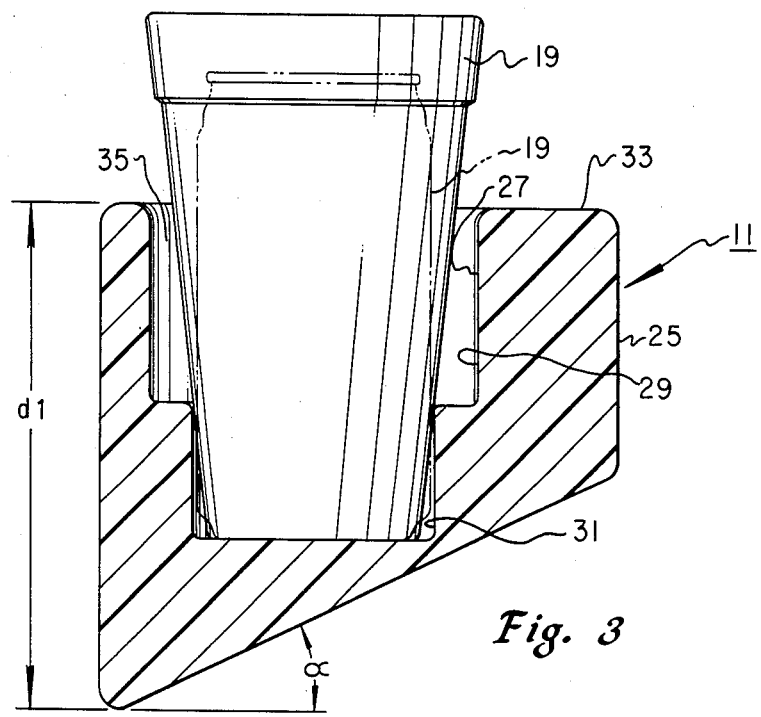
FIG. 3 is a cross-sectional view of the invention including a container.
Figure 4:
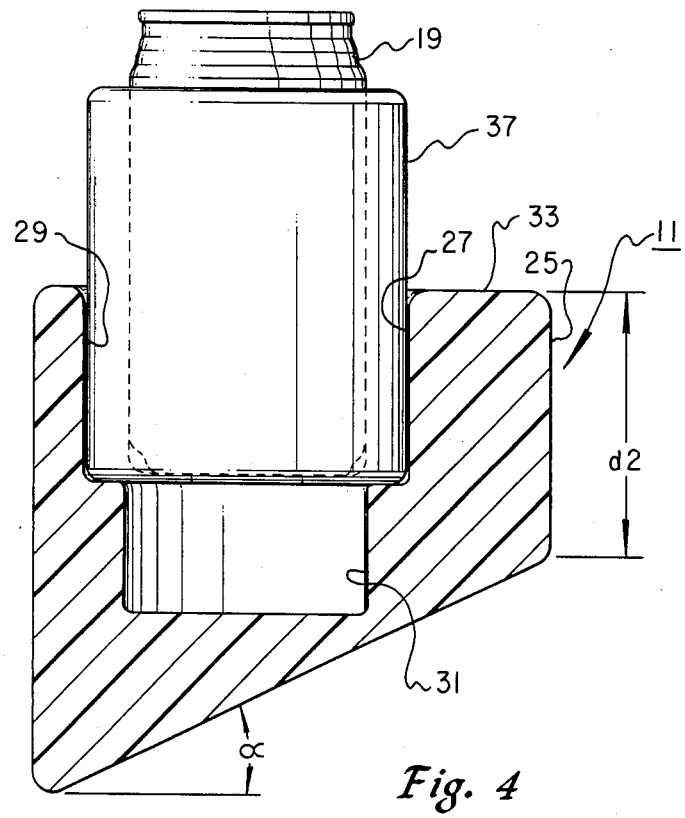
FIG. 4 is a cross-sectional view of the invention including an insulating sleeve (not in cross-section).

The holder 11 is illustrated more nearly completely in FIGS. 2-4. Specifically, the holder 11 has an arcuate first end 23 of a first depth d1. The holder 11 has a squared-off second end 25 of a second depth d2. The depth d1 is always greater than the depth d2 such that an angle alpha, FIG. 3, is formed between the bottom of the holder and the horizontal such that the angle alpha is in the range of 10°-40°, preferably about 30°. The angle alpha is provided to accomodate the angle of the seat 17 and provide a more nearly level condition for holding the container with the drink, or beverage, 21 therewithin.

The holder 11 is formed of an insulating material such as a thermoplastic foam. For example, Styrofoam can be employed as can be foamed polyurethane or the like. Other materials that could be employed would be wood or other insulating materials. Preferably, a thermoplastic foam is employed to facilitate molding of the holder in a unitary piece with the receptacle formed in the mold. The thermoplastic foam is impermeable although it may have porosity, for insulating purposes. We have found that a Styrofoam type of holder is excellent and accomplishes all of the objectives set forth herein.

As can be seen in FIGS. 2-4, the receptacle 27 is adapted to hold the container 19 for the drink. In the illustrated embodiment of FIG. 3, the receptacle has an upper portion 29 and a lower portion 31. The upper portion 29 is large enough to provide an annular space 35, FIG. 3, about most drink containers whether the container 19 be an inverted frusto-conical soft drink container, such as a fountain drink container or a can, as for beer or soft drink. In the illustrated embodiment, the bottom of the drink container fits snugly and conformingly into the lower portion 31 so as to be held relatively securely. (Most cans have similar dimensions so this can be done.) Yet, the receptacle will collect any spilled beverage or the like and prevent leaking, or spilling, onto the legs of the person. As illustrated in FIG. 4, the container 19 may have an insulating sleeve 37 disposed around it and yet the larger upper portion 29 will still accomodate, or receive, both the insulating sleeve and the container 19 with its beverage therewithin.

Preferably, the squared-off end 25 extends away from the receptacle for sufficient distance to provide an open space 33 for receiving a logo such as an advertisement for a drink manufacturer or the like.

The holder is readily molded in a unitary, single piece construction. It provides a drink holder that can receive a container, such as a can and insulating sleeve, or can alone, or an inverted frusto-conical drink container, readily. It can even receive the insulating cups such as the Styrofoam cups for hot coffee and the like, or the plastic cups for soft drinks, beer or the like. One advantage of this invention is that the driver can drink a liquid and readily retrieve and replace the drink container without danger of an accident or being at risk for spillage and the like. It allows both hands to be free when the drink container is stored. It fits between the legs and also levels out the surface of the seat on which the person is sitting so as to keep the container more nearly vertical, or with the beverage surface level. It eliminates spills, since there is no leakage because of the impermeable thermoplastic holder 11.

The drink holder of this invention can be employed and has its greatest advantage with respect to the driver of an automobile, but it can also be employed on a sofa, or in a boat or any other unlevel seating section or even on an unlevel surface such as the automobile dashboard, dashboard of a boat or the like. It can be employed by the driver or by the passenger or visitor.

The container being an insulator restricts heat flow into or out of the drink.

From the foregoing it can be seen that this invention provides the objectives delineated hereinbefore.

Although this invention has been described with a particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. A holder for containers for drinks and the like comprising a unitary structure that is adapted for safely holding a drink container in surroundings involving an unlevel surface and a person; said unitary structure being formed of an insulating material; having an arcuate first end of a first depth and a squared off second end of a second depth; having a receptacle formed therein sufficiently deep to hold a drink container and specifically greater than two inches in depth; said insulating material serving to reduce heat transfer between said drink and the surroundings; said holder being adapted to sit between the legs of the person with said first end adapted to fit the inter-crural region between the legs with second end extending away from said inter-crural region toward the knee; said first depth being greater than said second depth for obtaining a more nearly level condition for the drink container than the unlevel surface and sufficient for forming a bottom that has an angle alpha with respect to the horizontal that is greater than 10° and less than 45°; said holder facilitating safe retrieval and replacement of the drink container.

2. The holder of claim 1 wherein said receptacle comprises a lower portion of a first diameter and an upper portion of a second and larger diameter such that a drink container, even one comprising a smaller diameter bottom than top, a drink can, alone or with an insulating sleeve, can be set inside said receptacle and be more securely held in place.

3. The holder of claim 2 wherein said upper portion is substantially cylindrical and is larger than said lower portion such that insulated sleeve can be emplaced around a drink can and both said sleeve and can can be inserted within said upper portion of said receptacle; wherein said lower portion is substantially cylindrical and is adapted to receive said drink can in conforming relationship and has a depth greater than at least one half inch such that it can hold said can substantially vertically even with said upper portion having an annular space disposed about said can.

* * * * *